United States Patent
Anderson et al.

(10) Patent No.: US 10,450,400 B1
(45) Date of Patent: Oct. 22, 2019

(54) EXTRUDED RESORCINOL-FORMALDEHYDE, PHENOL-FORMALDEHYDE AND PHENOL-RESORCINOL-FORMALDEHYDE GEL RESINS

(71) Applicant: Arclin USA, LLC, Roswell, GA (US)

(72) Inventors: Mark Anderson, Roswell, GA (US); Sam Lonberg, Roswell, GA (US); Ron Huizingh, Roswell, GA (US); Reginald Mbachu, Roswell, GA (US)

(73) Assignee: Arclin USA, LLC, Roswell, GA (US)

( * ) Notice: Subject to any disclaimer, the term of this patent is extended or adjusted under 35 U.S.C. 154(b) by 125 days.

(21) Appl. No.: 15/347,042

(22) Filed: Nov. 9, 2016

Related U.S. Application Data

(63) Continuation-in-part of application No. 14/590,348, filed on Jan. 6, 2015.

(60) Provisional application No. 61/927,789, filed on Jan. 15, 2014.

(51) Int. Cl.
*B29C 48/29* (2019.01)
*C08G 8/22* (2006.01)

(52) U.S. Cl.
CPC .............. *C08G 8/22* (2013.01); *B29C 48/29* (2019.02); *C08G 2220/00* (2013.01)

(58) Field of Classification Search
CPC .. C08G 8/22; C08G 2220/00; B29C 47/1063; B29C 48/29
See application file for complete search history.

(56) References Cited

U.S. PATENT DOCUMENTS

| 413,113 A | 10/1889 | Von Buonaccorsi Di Pistoja |
| 1,660,403 A | 2/1928 | Turkington |
| 1,895,945 A | 1/1933 | Semon et al. |

(Continued)

FOREIGN PATENT DOCUMENTS

| DE | 2202202 A1 | 8/1972 |
| EP | 1607391 A1 | 12/2005 |

(Continued)

OTHER PUBLICATIONS

David B. Todd, "Mixing of Highly Viscous Media," Ullmann's Encyclopedia of Industrial Chemistry, vol. 23, 387-402, published online 2000 (Year: 2000).*

(Continued)

*Primary Examiner* — Nicholas E Hill
(74) *Attorney, Agent, or Firm* — Mendelsohn Dunleavy, P.C.

(57) ABSTRACT

A continuous process is provided for preparing a solid gel resin selected from resorcinol-formaldehyde gel resins, phenol-formaldehyde gel resins, and phenol-resorcinol-formaldehyde gel resins, using an extruder having at least one feed zone with a first temperature and at least one reaction zone with a second temperature that is higher than the first temperature. The process comprises steps of adding ingredients to the extruder at the feed zone, mixing the ingredients under heat to effectuate reaction between the ingredients to produce a liquid product exiting the extruder, and converting the liquid product exiting the extruder to the solid gel resin. A solid gel resin produced by the continuous process is also provided.

19 Claims, 4 Drawing Sheets

(56) References Cited

U.S. PATENT DOCUMENTS

| | | |
|---|---|---|
| 2,456,192 A | 12/1948 | Houlton |
| 2,658,054 A | 11/1953 | Coleman et al. |
| 2,688,606 A | 9/1954 | Schmitt et al. |
| 2,750,354 A | 6/1956 | Merriam |
| 2,927,097 A | 3/1960 | Von Berg et al. |
| 3,308,096 A | 3/1967 | Ivanoy et al. |
| 3,657,188 A | 4/1972 | Perkins, Jr. |
| 3,687,896 A | 8/1972 | Vargiu et al. |
| 3,816,376 A | 6/1974 | Brunnmueller et al. |
| 3,894,981 A | 7/1975 | Kruglikov et al. |
| 4,053,447 A | 10/1977 | Shea |
| 4,440,228 A | 4/1984 | Swanson |
| 4,458,062 A | 7/1984 | Blasing et al. |
| 4,499,125 A | 2/1985 | Blasing et al. |
| 4,996,289 A * | 2/1991 | Berbner ............... C08G 12/32 528/230 |
| 5,420,168 A | 5/1995 | Mayer et al. |
| 5,484,818 A | 1/1996 | De Vos et al. |
| 5,756,592 A | 5/1998 | Bedwell et al. |
| 5,792,826 A | 8/1998 | Tashima et al. |
| 6,083,619 A | 7/2000 | Frank et al. |
| 6,500,371 B1 | 12/2002 | Berbner et al. |
| 9,133,295 B2 | 9/2015 | Qureshi et al. |
| 9,353,208 B2 | 5/2016 | Arbuckle et al. |
| 2001/0034375 A1 | 10/2001 | Schwertfeger et al. |
| 2008/0112876 A1 | 5/2008 | Dailey |
| 2008/0311398 A1 | 12/2008 | Bauer et al. |
| 2011/0028599 A1 | 2/2011 | Costantino et al. |
| 2011/0207861 A1 * | 8/2011 | Omeis ............... C08G 73/0273 524/100 |
| 2013/0232884 A1 * | 9/2013 | Tumler ............... C08G 8/28 51/298 |
| 2014/0323681 A1 * | 10/2014 | Arbuckle ............... C08G 8/22 528/155 |

FOREIGN PATENT DOCUMENTS

| | | |
|---|---|---|
| EP | 1785438 A1 | 5/2007 |
| GB | 680245 | 10/1952 |
| GB | 1323301 | 7/1973 |
| GB | 1460029 | 12/1976 |
| JP | 59086618 A | 5/1984 |
| JP | 2004137312 A | 5/2004 |
| JP | 2005075939 A | 3/2005 |
| JP | 2006056959 A | 3/2006 |
| WO | WO03037955 A1 | 5/2003 |
| WO | WO2005068441 A1 | 7/2005 |
| WO | WO2010149632 A1 | 12/2010 |

OTHER PUBLICATIONS

Brandt, R., and J. Fricke. "Acetic-acid-catalyzed and subcritically dried carbon aerogels with a nanometer-sized structure and a wide density range." Journal of non-crystalline solids 350 (2004): 131-135.

Mulik, S., et al., "Acid-catalyzed time-efficient synthesis of resorcinol-formaldehyde aerogels and crosslinking with socyanates." Polymer Preprints 47.2 (2006): 364.

Fairén-Jiménez, D., F. Carrasco-Marin, and C. Moreno-Castilla. "Porosity and surface area of monolithic carbon aerogels prepared using alkaline carbonates and organic acids as polymerization catalysts." Carbon 44.11 (2006): 2301-2307.

* cited by examiner

EXTRUDED RESORCINOL-FORMALDEHYDE, PHENOL-FORMALDEHYDE AND PHENOL-RESORCINOL-FORMALDEHYDE GEL RESINS

RELATED APPLICATION DATA

This application is a continuation-in-part of U.S. patent application Ser. No. 14/590,348, filed Jan. 6, 2015, which claims priority to U.S. Provisional Application No. 61/927,789, filed Jan. 15, 2014, the entire disclosure of which is hereby incorporated by reference as if set forth fully herein.

PROBLEM/BACKGROUND

Field of Invention

This invention is generally related to a process for making phenolic gel resins. More particularly, this invention is related to a continuous process for making phenolic gel resins using extruders.

Description of the Related Art

Phenol-aldehyde resins are used as adhesives for many end applications such as structural composites of plywood, oriented strandboard (OSB) and wafer-board, prefabricated wood I-joists, laminated parallel strand lumber (PSL), laminated veneer lumber (LVL), and glulam. The phenol-aldehyde resins are typical manufactured in a batch process by reacting phenol with aldehyde under alkaline or acidic conditions. This batch process may require between 8-12 hours depending upon the final desired properties of the resin. The resin in a gel state typically requires an additional step to convert a liquid resin to the gel resin using post external heating at elevated temperatures over a period of time. The post external heating may need up to about 10 hours. Thus, the total cycle time to produce the gel resin is about 18-22 hours.

Attempts to make phenolic resins using a continuous process dated back to '20s when V. H. Turkington made an attempt to develop a continuous process for making phenolic resins in U.S. Pat. No. 1,660,403. This process uses a simple tube reactor with a coil in a heating oil bath as heating device. The tube reactor does not include a static mixer thus the ingredients in the reactor are not continuously mixed. U.S. Pat. No. 3,816,376 describes another continuous process for making phenolic resins using a cascade of at least three stirred vessels with back mixing of the solution. It was speculated that the back mixing reduces the Bodenstein number and widens the molecular weight distribution of the polymers.

JP2005075939 teaches a continuous process for manufacturing novolac, where the formaldehyde and phenol are mixed with a phosphoric acid solution in a continuous mixing device. This reference discloses mixing devices with mechanical moving parts or without mechanical moving parts. The latter mixing devices may include in-line mixers with 180 degree rotation. Additionally, the condensation reaction between formaldehyde and phenol in the mixing device takes several hours.

EP1785438 describes a continuous process for production of phenolic novolac resins which premixes the phenol, formaldehyde and acid catalyst. The mixture is then pumped through a tube reactor into the product vessel. The tube reactor has properties of a reduction of diameter and thus flow speed enhancement or variations of the length of the heating zone. The tube reactor is equipped with in-line mixers. This process is only suitable for novolac, but not gel resins.

The above continuous processes are designed to make phenolic resins, and are not designed to make gel resins. More recently, some continuous processes for making phenol-aldehyde gel resins have been developed. U.S. Pat. No. 9,133,295 (to George-Pacific Chemicals Inc.) discloses a method for making polymer particles in gel form via an emulsion and/or suspension polymerization. The method includes reacting a first reaction mixture comprising a phenolic monomer, an aldehyde monomer, and a first catalyst to produce a prepolymer, combining the prepolymer with a carrier fluid and a second catalyst to produce a second reaction mixture. The second catalyst can include a dicarboxylic acid, an anhydride, a dihydroxybenzene, or any mixture thereof. The method also includes polymerizing the prepolymer in the second reaction mixture to form polymer particles in gel form. This method may be performed as a continuous process using a loop reactor or a plug flow reactor.

U.S. Pat. No. 9,353,208 (to Hexion Inc.) discloses a method for making sol-gel resins using a one or two-step process. The methods include agitating phenolic compounds and aldehydes in the presence of a catalyst and a solvent. The reactants are added to a mixer over a period of time to avoid an undesirable buildup of heat within the reaction mixture. The method may be performed using an agitator and mixer including dough kneaders, twin-screw extruders, BUSS® kneaders, and pelletizers, planetary mixers and Morehouse Cowles® mixers.

WO 2010/149632 discloses a process for continuous production of an aqueous hydroxy-aryl formaldehyde resin solution, comprising the steps of preparing a reaction mixture of a hydroxy-aryl compound and an aqueous formaldehyde; adding a catalyst; reacting the reaction mixture in the presence of the catalyst. The reacting step is performed in a continuous plug flow reactor. The plug flow reactor may have either in-line mixing elements or by turbulent plug flow. In a plug flow reaction, the reaction mixture is pumped through a housing of the reactor, preferably a tube, where the chemical reaction proceeds as the reaction mixture travels through the tube.

Using these prior art processes, the production of gel resins can be difficult due to the lack of control during the gelation of the polymers. Specifically, the polymerization necessary to produce a gel resin in these processes may result in a gel form that is difficult to process further. These gel resins are formed as a monolith that would require extensive handling, which is undesirable in commercial applications where economy is often found in scale.

It is desirable to develop a process that can produce gel resins with improved properties. The present invention provides a novel continuous process using a heated extruder to make phenol-formaldehyde, resorcinol-formaldehyde, or phenol-resorcinol-formaldehyde gel resin that are easy to handle. The process can also greatly reduce the overall batch cycle time and is easily scalable to a commercial production scale.

SUMMARY OF THE INVENTION

In one embodiment, the invention provides a continuous process for preparing a solid gel resin selected from resorcinol-formaldehyde gel resins, phenol-formaldehyde gel resins, and phenol-resorcinol-formaldehyde gel resins, using an extruder having at least one feed zone with a first temperature and at least one reaction zone with a second temperature that is higher than the first temperature, the process comprising steps of:

adding ingredients to the extruder at the at least one feed zone;

mixing the ingredients under heat to effectuate reaction between the ingredients to produce a liquid product exiting the extruder; and converting the liquid product exiting the extruder to the solid gel resin.

In the foregoing embodiment, the second temperature is in a range of from about 60° C. to about 190° C., or from about 70° C. to about 175° C., or from about 80° C. to about 170° C., or from about 85° C. to about 165° C., or from about 90° C. to about 160° C., or from about 95° C. to about 160° C., or from about 100° C. to about 155° C., or from about 105° C. to about 150° C., or from about 110° C. to about 150° C., or from about 115° C. to about 150° C., or from about 120° C. to about 145° C., or from about 125° C. to about 140° C., or from about 130° C. to about 140° C.

In each of the foregoing embodiments, the first temperature is in a range of from about 30° C. to about 115° C., or from about 50° C. to about 90° C., or from about 55° C. to about 90° C., or from about 60° C. to about 90° C., or from about 65° C. to about 75° C., or from about 65° C. to about 70° C.

In each of the foregoing embodiments, the ingredients include a buffer with a pH in a range of from about pH 1.5 to about pH 5, or from about pH 2 to about pH 4.5, or from about pH 2 to about pH 4, or from about pH 2 to about pH 3.

In each of the foregoing embodiments, the buffer is selected from ammonium acetate buffer, sodium acetate buffer, sodium citrate buffer, ammonium lactate buffer, and ammonium citrate buffer.

In each of the foregoing embodiments, the converting step comprises cooling down the liquid product to yield the solid gel resin.

In each of the foregoing embodiments, the converting step comprises heating the liquid product to yield the solid gel resin and the heating is achieved by infrared heating or thermal heating.

In each of the foregoing embodiments, the converting step comprises curing the liquid product to yield the solid gel resin.

In each of the foregoing embodiments, the ingredients include a precondensate selected from a precondensate of phenol and formaldehyde, a precondensate of resorcinol and formaldehyde, and a precondensate of phenol, resorcinol and formaldehyde.

In each of the foregoing embodiments, the ingredients further comprise formaldehyde.

In each of the foregoing embodiments, the formaldehyde is in an aqueous solution having a concentration of from about 25 wt. % to about 50 wt. %, or from about 30 wt. % to about 40 wt. %, based on the weight of the aqueous solution.

In each of the foregoing embodiments, the precondensate is produced by heating the ingredients.

In foregoing embodiment, the heating comprises heating the ingredients to a temperature in a range of from about 20° C. to about 120° C., preferably from about 25° C. to about 103° C.

In each of the foregoing embodiments, the precondensate has a number average molecular weight in a range of from about 150 to about 1,500 Dalton, or from about 200 to about 800 Dalton.

In each of the foregoing embodiments, the precondensate has a viscosity in a range of from about 5 to about 100 cps, or about 10 to about 50 cps, or from about 15 to about 45 cps, or from about 20 to about 40 cps, or from about 25 to about 35 cps.

In each of the foregoing embodiments, the ingredients include a catalyst selected from an acid and a base.

In the foregoing embodiment, the catalyst is an acid selected from acetic acid, formic acid, lactic acid, citric acid, and oxalic acid.

In each of the foregoing embodiments, the solid gel resin is resorcinol formaldehyde and the molar ratio of formaldehyde to resorcinol is in a range of from about 0.75 to about 3.5, or from about 1.0 to about 2.0, or from about 1.2 to about 1.8, or from about 1.3 to about 1.7.

In each of the foregoing embodiments, the solid gel resin is phenol formaldehyde and the molar ratio of formaldehyde to phenol is in a range of from about 0.75 to about 3.5, or from about 1.0 to about 2.0, or from about 1.2 to about 1.8, or from about 1.3 to about 1.7.

In each of the foregoing embodiments, the solid gel resin is phenol resorcinol formaldehyde and the molar ratio of formaldehyde to phenol and resorcinol is in a range of from about 0.75 to about 3.5, or from about 1.0 to about 2.0, or from about 1.2 to about 1.8, or from about 1.3 to about 1.7.

In each of the foregoing embodiments, the flow rate in the extruder is in a range of from 5 to about 100 lb/hr, or from about 10 to 50 lb/hr.

In each of the foregoing embodiments, the extruder has a cooling zone with a third temperature between the reaction zone and the exit of the extruder.

In the foregoing embodiment, the third temperature in the cooling zone is in a range of from about 40° C. to about 120° C. or from about 50° C. to about 100° C., or from about 55° C. to about 95° C., or from about 55° C. to about 90° C., or from about 60° C. to about 90° C., or from about 60° C. to about 85° C., or from about 65° C. to about 80° C., or from about 65° C. to about 75° C., or from about 70° C. to about 75° C.

In each of the foregoing embodiments, the extruder has at least one vent to let water escape out of the extruder.

In the foregoing embodiment, the at least one vent is two vents and one of the two vents is in the reaction zone.

In each of the foregoing embodiments, the ingredients are preheated prior to their addition to the extruder.

In each of the foregoing embodiments, the cooling is an air cooling and/or water cooling.

In each of the foregoing embodiments, the solid gel resin is crosslinked in 3 dimensions and is substantially not able to melt and is substantially not soluble at room temperature in a non-degrading solvent such as DMF or DMSO.

In each of the foregoing embodiments, the precondensate has a polydispersity (Mw/Mn) in a range of from 2 to 6, or from 3 to 5.

In each of the foregoing embodiments, the process is performed essentially without a carrier liquid.

In the foregoing embodiment, the carrier liquid is an oil.

In each of the foregoing embodiments, the temperature of a barrel in the at least one reaction zone varies from the temperature of the ingredients in said barrel by less than 5° C., or less than about 4° C., or less than about 3° C., or less than about 2° C., or less than about 1° C.

In one embodiment, the present invention provides a solid gel resin produced by the continuous process of each of the foregoing embodiments.

In the foregoing embodiment, the solid gel resin comprises solids (excluding any amounts of catalyst) in a range of from about 30 wt % to about 70 wt %, or from about 35 wt % to about 65 wt %, or from about 40 wt % to about 60 wt %, or from about 45 wt % to about 55 wt %, based on the total weight of the solid gel resin product.

In each of the foregoing embodiments, the solid gel resin has a volatile content in a range of from about 10 wt % to about 35 wt %, or from about 12 wt % to about 20 wt %, or from about 12 wt % to about 17 wt %.

In each of the foregoing embodiments, the solid gel resin has a density in a range of from about 0.3 to about 1.4 g/cm$^3$, preferably from about 0.4 to about 0.8 g/cm$^3$.

DESCRIPTION OF THE PREFERRED EMBODIMENTS

Figure 1:
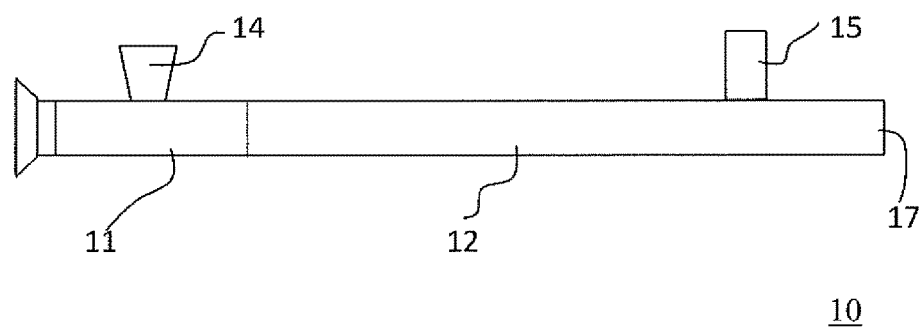
FIG. 1 is a schematic cross section of an extruder showing a feed zone and a reaction zone in an embodiment of the invention.

It must be noted that as used herein and in the appended claims, the singular forms "a", "an", and "the" include plural references unless the context clearly dictates otherwise. Furthermore, the terms "a" (or "an"), "one or more," and "at least one" can be used interchangeably herein. The terms "comprising," "including," "having," and "constructed from" can also be used interchangeably.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4. It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

In preferred embodiments, the present invention provides a continuous process for preparing a solid gel resin selected from resorcinol-formaldehyde gel resins, phenolformaldehyde gel resins, and phenol-resorcinol-formaldehyde gel resins, using an extruder 10, 20, 30, 40, 50, 60 having at least one feed zone 11, 21, 31, 41, 51, 61 with a first temperature and at least one reaction zone 12, 22, 32, 42, 52, 62 with a second temperature that is higher than the first temperature. The continuous process comprises the steps of (a) adding ingredients to the extruder 10, 20, 30, 40, 50, 60 at the at least one feed zone 11, 21, 31, 41, 51, 61; (b) mixing the ingredients under heat to effectuate reaction between the ingredients to product a liquid product exiting the extruder 10, 20, 30, 40, 50, 60; and (c) converting the liquid product exiting the extruder 10, 20, 30, 40, 50, 60 to the solid gel resin.

The term "solid gel resin" as used herein is a polymer that is crosslinked in 3 dimensions and is substantially not able to melt and is substantially not soluble at room temperature in a non-degrading solvents such as N,N-dimethylformamide (DMF) and dimethylsulfoxide (DMSO). The fact that the solid gel resin is "substantially" not able to melt means that the >80 wt % of the product will degrade rather than melt when exposed to increasing heat, preferably >90 wt % will degrade rather than melt, and more preferably, >99 wt % will degrade rather than melt. The fact that the solid gel resin is "substantially" not soluble at room temperature means that less than 5 wt % of the solid gel resin will dissolve in either DMF or DMSO at room temperature, preferably less than 1 wt % will dissolve, and more preferably, less than 0.5 wt % will dissolve.

Referring to FIG. 1, the extruder 10 has two zones: a feed zone 11 with a first temperature and a reaction zone 12 with a second temperature that is higher than the first temperature. The ingredients are added to the extruder 10 through a feed hopper 14 in the feed zone 11. The extruder 10 mixes these ingredients to form a reaction mixture, which is pushed into the reaction zone 12 by the one or more screws in the extruder 10. The ingredients continue to be mixed as they are heated to the second temperature in the reaction zone 12, thus effectuating a condensation reaction which produces a polymer and water as a byproduct.

There is a vent 15 in the reaction zone 12, at a location preferably in the half of the reaction zone 12 closer to the exit 17. The vent 15 functions to vent the water in the extruder 10 to outside of the extruder 10. Because water is a product of the condensation reaction, venting of water outside of the extruder 10 can drive the condensation reaction forward. Thus, the liquid product exiting the extruder 10 will have much higher levels of cross-linking between the phenol/resorcinol and formaldehyde. In a preferred embodiment, some volatiles in reaction mixture in the extruder 10 will also been vented outside of the extruder 10. This may result in low volatile level in the liquid product exiting the extruder 10 at exit 17.

The extruder can be a single screw or twin screw extruder. Preferably, the extruder is a twin screw extruder having a diameter of the barrels in the range of from about 25 mm to about 100 mm, preferably from about 27 mm to about 92 mm.

Figure 2:
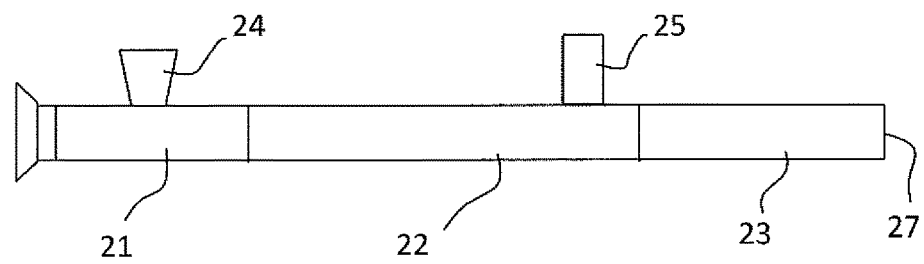
FIG. 2 is a schematic cross section of an extruder showing a feed zone, a reaction zone, and a cooling zone in an embodiment of the invention.
Figure 3:
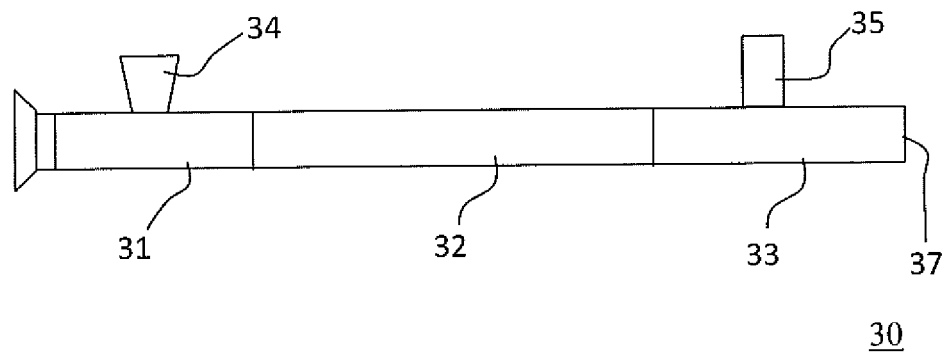
FIG. 3 is a schematic cross section of an extruder that is a variation of the extruder of FIG. 2, with the vent located in the cooling zone.

Referring to FIG. 2, in addition to the feed zone 21 with a first temperature and a reaction zone 22 with a second temperature, the extruder 20 preferably also has a cooling zone 23 with a third temperature. The feed hopper 24 is in the feed zone 21. The third temperature is lower than the second temperature. The vent 25 is located in the reaction zone 22. In another preferred embodiment, extruder 30 is a variation of the extruder 20 in FIG. 2, where extruder 30 has a feed zone 31 with a first temperature and a reaction zone 32 with a second temperature, and a vent 35 located in the cooling zone 33 (FIG. 3). The feed hopper 34 is in the feed zone 31. In yet another preferred embodiment, the extruder 20, 30 may have two vents 25, 35, one in the reaction zone 22, 32 and the other in the cooling zone 23, 33. In yet another preferred embodiment, the reaction zone 22, 32 has two or more vents 25, 35, with optionally another vent 25, 35 in the cooling zone 23, 33.

Figure 4:
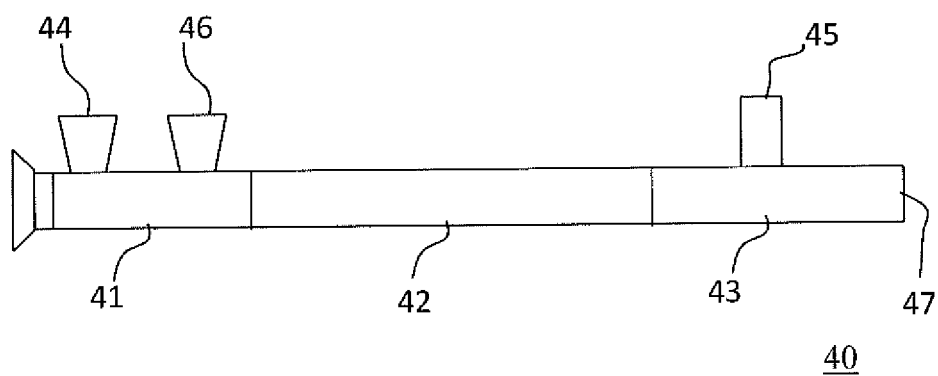
FIG. 4 is a schematic cross section of an extruder that is a variation of the extruder of FIG. 3, with two feed hoppers in the feed zone.

In a preferred embodiment, the extruder 40 has a feed zone 41 with a first temperature and a reaction zone 42 with a second temperature, and a cooling zone 43 with a third temperature (FIG. 4). The vent 45 is in the cooling zone 43. The extruder 40 has two feed hoppers 44, 46. One of the two feed hoppers 44, 46 is for feeding the solid ingredients, preferably the upstream feed hopper 44. The other one of the two feed hoppers 44, 46 is for feeding the liquid ingredients, preferably the downstream feed hopper 46.

In a preferred embodiment, the first temperature is in the range of from about 30 to about 115° C., or preferably from about 50° C. to about 100° C., or preferably from about 50° C. to about 90° C., or preferably from about 55° C. to about 90° C., or preferably from about 60° C. to about 90° C., or preferably from about 65° C. to about 75° C., or preferably from about 65° C. to about 70° C. The first temperature is for raising the temperature of the added ingredients such that the ingredients will quickly be heated to the second temperature once the ingredients enter the reaction zone 12, 22, 32, 42, which will allow the ingredients to react with each other quickly in the reaction zone 12, 22, 32, 42. However, the first temperature should not be so high as to effectuate significant reactions between the ingredients.

Once the reaction mixture enters that reaction zone 12, 22, 32, 42, the ingredients in the reaction mixture undergo a condensation reaction to form cross-linked polymers and water. The polymers are in a liquid form, while the water will be vented outside of the extruder 10, 20, 30, 40 through the vent 15, 25, 35, 45. The condensation reaction is effectuated by heating to the ingredients in the reaction zone 12, 22, 32, 42 to the second temperature in the range of from about 60° C. to about 190° C., or from about 70° C. to about 175° C., or preferably from about 80° C. to about 170° C., or preferably from about 85° C. to about 165° C., or preferably from about 90° C. to about 160° C., or preferably from about 95° C. to about 160° C., or preferably from about 100° C. to about 155° C., or preferably from about 105° C. to about 150° C., or preferably from about 110° C. to about 150° C., or preferably from about 115° C. to about 150° C., or preferably from about 120° C. to about 145° C., or preferably from about 125° C. to about 140° C., or preferably from about 130° C. to about 140° C.

The reaction mixture either remains or becomes a liquid product as it leaves the reaction zone 12, 22, 32, 42, preferably entering the cooling zone 13, 23, 33, 43. The cooling zone 13, 23, 33, 43 has a third temperature that is lower than the second temperature in the reaction zone 12, 22, 32, 42. The liquid product cooling zone 13, 23, 33, 43 may still have some level of condensation reaction occurring, but at a significantly lower level than the condensation reaction in the reaction zone 12, 22, 32, 42. It is important that the mixture in the extruder remains a liquid with some solids as it passes through the cooling zone 13, 23, 33, 43 so as to effectuate flow of the product out of the exit 17, 27, 37, 47 and not have so much solid content as to clog the extruder.

In some preferred embodiments, the third temperature is in the range of from about 40° C. to about 120° C. or from about 50° C. to about 100° C., or preferably from about 55° C. to about 95° C., or preferably from about 55° C. to about 90° C., or preferably from about 60° C. to about 90° C., or preferably from about 60° C. to about 85° C., or preferably from about 65° C. to about 80° C., or preferably from about 65° C. to about 75° C., or preferably from about 70° C. to about 75° C.

Figure 5:
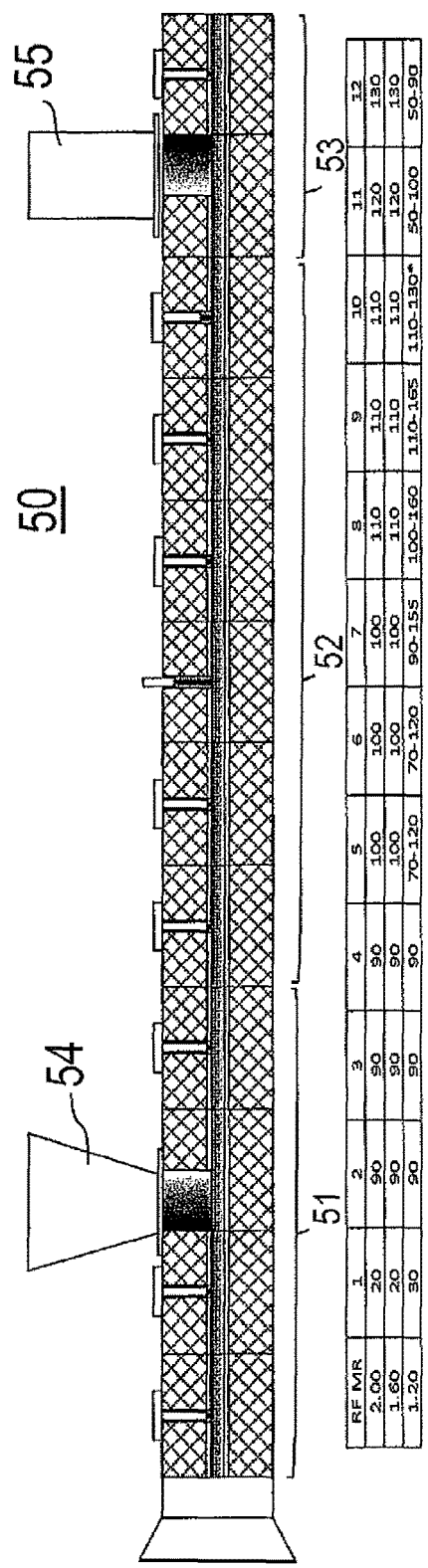
FIG. 5 is a schematic cross section of an extruder that is configured to have twelve sections with each heated by a heating barrel.

Referring to FIG. 5, in one preferred embodiment, the extruder 50 has a feed zone 51 and a reaction zone 52. The zone labelled 53 may be a continuation of the reaction zone or may be configured as a cooling zone 53 (FIG. 5). The vent 55 is located in the zone 53. The temperatures in these three zones are fine-tuned using heating barrels. Thus, each of the first, second and third temperatures has different temperatures depending the temperature of the heating barrels used (FIG. 5). In this preferred embodiment, the feed zone 51 has four sections with four heating barrels, the reaction zone 52 has six sections with six heating barrels, and the cooling zone 53 has two sections with two heating barrels. Total of twelve heating barrels are used to maintain the temperature configuration of the extruder 50 (see the temperature configuration in FIG. 5). The temperature of each heating barrel may be individually controlled, which may be the same or different from the temperature of the heating barrel next to it. This configuration provides precisely controlled temperatures along the extruder 50. Not only the temperatures of feed zone 51, reaction zone 52 and zone 53 are different, these different sections within each of feed zone 51, reaction zone 52 or zone 53 may also have different temperatures.

Figure 6:
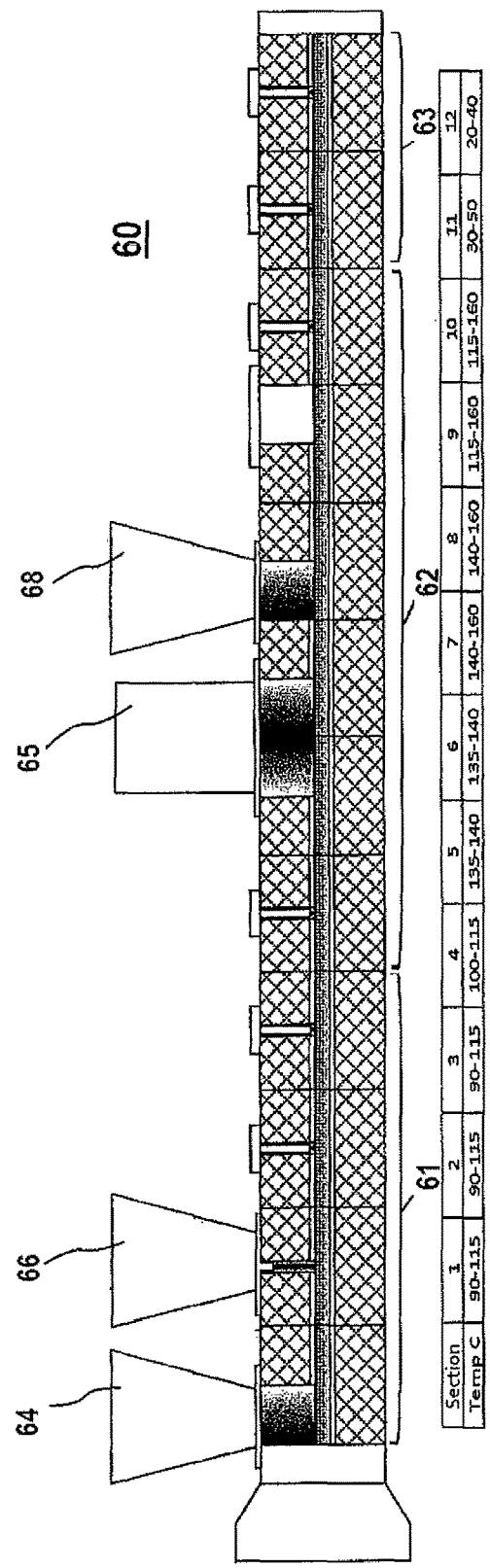
FIG. 6 is a schematic cross section of an extruder that is a variation of the extruder of FIG. 5, with an additional feed hopper in the feed zone and an additional feed hopper in the reaction zone.

In another preferred embodiment as shown in FIG. 6, the extruder 60 has a feed zone 61, a reaction zone 62, and a cooling zone 63. The vent 63 is located in the reaction zone 62. The temperatures in these three zones are likewise fine-tuned using barrel heating, similar to the embodiment of FIG. 5. In this preferred embodiment, the feed zone 61 has four sections with four heating barrels, the reaction zone 62 has six sections with six heating barrels, and the cooling zone 63 has two sections with two heating barrels. Total of twelve heating barrels are used to maintain the temperature of the extruder 60. The temperature of each heating barrel may be individually controlled, which may be the same or different from the temperature of the heating barrel next to it, similar to the extruder configuration of FIG. 5. The extruder 60 has three feed hoppers 64, 66, 68, where the most upstream feed hopper 64 is used for feeding solid ingredients and the two downstream feed hoppers 66, 68 are used for feeding liquid ingredients (FIG. 6).

The heating barrels provide the heat to maintain the temperatures in the extruder 10, 20, 30, 40, 50, 60. The temperature of a heating barrel may be slightly higher than the temperature of the corresponding section of the extruder 10, 20, 30, 40, 50, 60. In one preferred embodiment, the temperature of a heating barrel is higher than the temperature of the corresponding section of the extruder 10, 20, 30, 40, 50, 60 by less than about 5° C., or preferably less than about 4° C., or preferably less than about 3° C., or preferably less than about 2° C., or preferably less than about 1° C.

In one preferred embodiments, the ingredients added to the extruder 10, 20, 30, 40, 50, 60 are the monomers selected from formaldehyde, phenol, and resorcinol, or a homomonomer of para-formaldehyde. Specifically, the solid gel resin of resorcinol-formaldehyde requires ingredients of resorcinol and formaldehyde or a para-formaldehyde. The solid gel resin of phenol-formaldehyde requires ingredients of phenol and formaldehyde or a para-formaldehyde. The solid gel resin of phenol-resorcinol-formaldehyde requires ingredients of phenol, resorcinol, and formaldehyde or a para-formaldehyde.

The para-formaldehyde is mono-polymer of formaldehyde in a formula of $OH(CH_2O)_nH$, where n is from about 5 to about 140, or preferably from about 8 to about 100, or preferably from 20 to about 90. The para-formaldehyde is typically solid at room temperature. Both phenol and resorcinol are solid at room temperature.

Formaldehyde is preferably in an aqueous solution having a concentration of from about 25 wt. % to about 50 wt. %, preferably from about 30 wt. % to about 40 wt. %, and most preferably at about 35 wt. %, based on the weight of the aqueous solution.

In some preferred embodiments, a buffer may be added to the extruder 10, 20, 30, 40, 50, 60. The buffer preferably has a pH in the range of from about pH 1.5 to about pH 5, or preferably from about pH 2 to about pH 4.5, or preferably from about pH 2 to about pH 4, or preferably from about pH 2 to about pH 3. The buffer is selected from ammonium acetate buffer, sodium acetate buffer, sodium citrate buffer, ammonium lactate buffer, and ammonium citrate buffer.

In some preferred embodiments, a catalyst may be added to the extruder 10, 20, 30, 40, 50, 60. The catalyst may be a base or an acid. The acid is preferably acetic acid, formic acid, nitric acid, citric acid, lactic acid, oxalic acid, methane sulfonic acid and any mixture thereof. The base is preferably ammonia, dimethylethanolamine, ethylenediamine, triethylamine, trimethylamine, tripropylamine, diethylethanolamine, hexamethylenetetramine, lithium carbonate, or any mixture thereof.

In preferred embodiments, the solid ingredients and liquid ingredients are added separately to the extruder 10, 20, 30, 40, 50, 60. All of the liquid ingredients are preferably mixed thoroughly before being added to the extruder 10, 20, 30, 40, 50, 60. The solid ingredients are added separately, prior to or after the liquid ingredients have been added to the extruder 10, 20, 30, 40, 50, 60. In a more preferred embodiment, the liquid ingredients and solid ingredients are separately added to the extruder 10, 20, 30, 40, 50, 60 using separate feed hopper 44, 46, 64, 66, 68.

In one preferred embodiment, any one of the solid ingredients, such as phenol or resorcinol, may be melt and the molten ingredients can be mixed with other liquid ingredients. The mixed liquid ingredients are then added to the extruder 10, 20, 30, 40, 50, 60. In another preferred embodiment, the molten ingredient can be added separately from the other combined liquid ingredients to the extruder 10, 20, 30, 40, 50, 60. These other liquid ingredients may be individually preheated or the combined liquid ingredients may be preheated together.

In some preferred embodiment, the ingredients include a precondensate of phenol and/or resorcinol with formaldehyde and/or para-formaldehyde. In one preferred embodiment, all of the phenol and/or resorcinol and a portion of the formaldehyde and/or para-formaldehyde are mixed to produce the precondensate. The precondensate is selected from a precondensate of phenol and formaldehyde/para-formaldehyde, a precondensate of resorcinol and formaldehyde/para-formaldehyde, and a precondensate of phenol, resorcinol and formaldehyde/para-formaldehyde. The precondensate and the remaining portion of the formaldehyde and/or para-formaldehyde are then added together or separately to the extruder 10, 20, 30, 40, 50, 60 to further react to produce the liquid product.

In some preferred embodiments, the precondensate is preferably produced by heating the ingredients needed to produce the precondensate, such as resorcinol and formaldehyde in a batch reactor. The heating typically bring the temperature of the ingredients to a range of from about 80° C. to about 120° C., preferably from about 90° C. to about 103° C. more preferably from about 95° C. to about 103° C.

In an embodiment, the solid gel resin product is formed from the precondensate and formaldehyde, wherein essentially all of the phenol and/or resorcinol groups on the backbone of the solid gel resin product come from the precondensate. In other words, the precondensate is combined with formaldehyde and no other added phenol and/or resorcinol monomers. The precondensate is preferably made from all of the phenol and/or resorcinol and a portion of the formaldehyde. This portion of the formaldehyde used in the precondensate is preferably from about 30% to about 70%, or preferably from about 40% to about 60%, or preferably from about 45% to about 55%, of the formaldehyde needed to make the final solid gel resin. It is an option in the present invention to use the precondensate formed in the batch reactor as a mixture without further purification before adding it to the extruder.

The precondensate is in a liquid form and remains very stable for weeks or even months at room temperature. The ingredients reacted with each other to form oligomers in the precondensate. For example, the phenol and/or resorcinol react with formaldehyde to form oligomers with a relatively low molecular weight. Thus, the molecular weight of the oligomers in the precondensate may be used as a measurement of the level of polymerization in the precondensate. Preferably, the precondensate has a number average molecular weight (Mn) in a range of from about 150 to about 1,500 Dalton, preferably about 200 to about 800 Dalton; a weight average molecular weight (Mw) in a range of from about 400 to about 3,000 Dalton, preferably about 500 to about 1,600 Dalton; or a z-average molecular weight (Mz) in a range of from about 500 to about 6,000 Dalton, preferably about 1,000 to about 4,000 Dalton.

Another measurement of the level of polymerization in the precondensate is the viscosity of the precondensate. Preferably, the precondensate has a viscosity in a range of from about 5 to about 100 cps, or about 10 to about 50 cps, or preferably from about 15 to about 45 cps, or preferably from about 20 to about 40 cps, or preferably from about 25 to about 35 cps. The viscosity of the precondensate is measured by Gardner Holt Viscosity Tubes.

The precondensate has a polydispersity (Mw/Mn) preferably in the range of from about 2 to about 6, or preferably from about 3 to about 5. The molecular weight parameters and polydispersity are measured as follows: Molecular weights (Mw, Mn, Mz) were determined by Gel Permeation Chromatography using a Viscotek Triple Detector system Model 302. Separation was accomplished with a bank of microstyragel columns using additized tetrahydrofuran as the solvent and eluent. Molecular weights (Mw, Mn, Mz) were calculated with the OMNISEC software supplied with the instrument.

In some preferred embodiments, of all the formaldehyde needed to make solid gel resin, from about 30% to about 70% of which is used in producing the precondensate. The remaining about 30% to about 70% of the formaldehyde is added directly to the extruder 10, 20, 30, 40, 50, 60, along with the precondensate.

In one preferred embodiment, ingredients are individually preheated prior to their addition to the extruder 10, 20, 30, 40, 50, 60. The preheating preferably brings the temperature of the ingredients to a range of from about 40° C. to about 90° C., or preferably from about 50° C. to about 80° C., or preferably from about 50° C. to about 70° C., or preferably from about 50° C. to about 60° C.

The ingredients, after being added to the extruder 10, 20, 30, 40, 50, 60 are mixed and pushed from the feed zone 11, 21, 31, 41, 51, 61 to the reaction zone 12, 22, 32, 42, 52, 62, and optionally to the cooling zone 23, 33, 43, 53, 63, and eventually to the exit 17, 27, 37, 47 as a liquid product. The flow rate in the extruder is in the range of from about 5 to about 100 lb/hr, or from about 10 lb/hr to about 50 lb/hr. The screw speed is about 200-500 rpm, preferably about 250-450 rpm.

In one preferred embodiment, the solid gel resin is resorcinol-formaldehyde gel resin that is a copolymer of resorcinol and formaldehyde. The molar ratio of formaldehyde to resorcinol for making the final solid resorcinol-formaldehyde gel resin is in a range of from about 0.75 to about 3.5, preferably from about 1.0 to about 2.0, or more preferably from about 1.2 to about 1.8, or preferably from about 1.3 to about 1.7. In preferred embodiments, the molar ratio of formaldehyde to resorcinol for making the precondensate is in a range of from about 0.25 to about 1.5, preferably from about 0.5 to about 1.0, or more preferably from about 0.6 to about 0.9, or preferably from about 0.7 to about 0.8.

In another preferred embodiment, the solid gel resin is phenol-formaldehyde gel resin that is copolymer of phenol and formaldehyde. The molar ratio of formaldehyde to phenol for making the final solid phenol-formaldehyde gel resin is in a range of from about 0.75 to about 3.5, preferably about 1.0 to about 2.0, or more preferably from about 1.2 to about 1.8, or preferably from about 1.3 to about 1.7. In preferred embodiments, the molar ratio of formaldehyde to phenol for making the precondensate is in a range of from about 0.25 to about 1.5, preferably from about 0.5 to about 1.0, or more preferably from about 0.6 to about 0.9, or preferably from about 0.7 to about 0.8.

In another preferred embodiment, the solid gel resin is phenol-resorcinol-formaldehyde gel resin that is copolymer of phenol, resorcinol and formaldehyde. The molar ratio of formaldehyde to phenol plus resorcinol for making the final solid phenol-resorcinol-formaldehyde gel resin is in a range of from about 0.75 to about 3.5, preferably from about 1.0 to about 2.0, or more preferably from about 1.2 to about 1.8, or preferably from about 1.3 to about 1.7. In preferred embodiments, the molar ratio of formaldehyde to phenol plus resorcinol for making the precondensate is in a range of from about 0.25 to about 1.5, preferably from about 0.5 to about 1.0, or more preferably from about 0.6 to about 0.9, or preferably from about 0.7 to about 0.8.

The mixture flowing through the extruder will contain water, which may be a byproduct of the condensation reaction of the phenol and/or resorcinol with formaldehyde, or it may be from ingredients added as aqueous solutions. In some preferred embodiments, the continuous process is performed essentially free of a carrier liquid (other than water), especially a vegetable oil, a mineral oil, or an organic solvent. Some of the liquid ingredients, such as formaldehyde and acetic acid (catalyst), may be in aqueous solutions that do not mix well with an oil or organic solvent. Here the terms "essentially free" are used to mean that the mixture can have less than 5 wt % of a vegetable oil, a mineral oil, or an organic solvent, preferably less than 1 wt % and more preferably less than 0.5 wt %. There is no emulsion or suspension formed in the inventive process.

As used herein, the term "carrier fluid" refers to any suspension fluid, solvent, medium, diluent, dispersion fluid, emulsion fluid, and/or the continuous phase of the suspension and/or emulsion.

The product exiting the extruder 10, 20, 30, 40, 50, 60 is a liquid. The liquid product is still hot, with a temperature much higher than the room temperature, because the liquid product can retain heat it absorbed from the heated extruder 10, 20, 30, 40, 50, 60.

In preferred embodiments, the liquid product has a high viscosity in the range of from about 500 cps to about 2,500 cps, preferably from about 800 cps to about 2,200 cps, and more preferably from about 1000 cps to about 2000 cps. The liquid product comprises solids (excluding any catalyst remaining in the product) in the liquid preferably in a range of from about 30 wt % to about 70 wt %, or preferably from about 35 wt % to about 65 wt %, or preferably from about 40 wt % to about 60 wt %, or preferably from about 45 wt % to about 55 wt %. based on the total weight of the liquid product.

Because of the vent in the extruder 10, 20, 30, 40, 50, 60, the liquid product has very little water. In some preferred embodiments, the liquid product has less than about 5 wt. %, or preferably less than about 4 wt. %, or preferably less than about 3 wt. %, or preferably less than about 2 wt. %, or preferably less than about 1 wt. % of water based on the total weight of the liquid product.

After the liquid product exits the extruder 10, 20, 30, 40, 50, 60, the liquid product is converted to the final solid gel resin. In some preferred embodiments, the liquid product is simply cooled down to yield the solid gel resin. In one preferred embodiment, the liquid product is cooled down to a temperature below about 50° C., or preferably below about 45° C., or preferably below about 40° C., or preferably below about 35° C., or preferably below about 30° C., or preferably below about 25° C. Though the liquid product may be cooled to a temperature below 0° C., the temperature is typical above 0° C., or preferably above 10° C., or preferably at about room temperature.

In preferred embodiments, the cooling of the liquid product may be effectuated by an air cooling and/or water cooling.

In some preferred embodiments, the liquid product is converted to the solid gel resin through heating of the liquid product. The heating accelerates solidification of the liquid product. In one preferred embodiment, the liquid product is heated to a temperature in the range of from about 60° C. to about 120° C., or preferably from about 70° C. to about 110° C., or preferably from about 80° C. to about 100° C., or preferably from about 85° C. to about 95° C.

In preferred embodiments, the heating may be effectuated by infrared heating or thermal heating. The heating can promote curing of the liquid product to form the solid gel resin. In some preferred embodiments, the liquid product converts to the solid gel resin through curing of the liquid product. Curing provides further cross-linking reactions between the polymers in the liquid product and leads to complete cross-linking in all three dimensions within the solid gel resin. It is possible for the liquid product exiting the extruder 10, 20, 30, 40, 50, 60 to be essentially fully cured and that solidification occurs by simply air cooling, and it is possible for the liquid product to continue to cure with heat remaining in the liquid from the extruder 10, 20, 30, 40, 50, 60 as it is air or water cooled. In an embodiment, the polydispersity (Mw/Mn) of the liquid product exiting the extruder is about 1.08-1.30, but after extended curing, the polydispersity cannot be determined since this product is an infusible 3-dimensional cross-linked gel that cannot be dissolved by any non-degrading solvent and molecular weights of such product cannot be determined with routine polymer characterization techniques.

The solid gel resin produced by the present invention is a polymer that is completely cross-linked in all three dimensions. The solid gel resin is essentially not soluble at room temperature in a non-degrading solvent. The solid gel resin preferably has a high density in the range of from about 0.3 to about 1.4 $g/cm^3$, preferably from about 0.4 to about 0.8 $g/cm^3$.

The solid gel resin has a volatile content in a range of from about 10 wt % to about 35 wt %, preferably about 12-20 wt %, more preferably from about 12 wt % to about 17 wt %.

The ingredients added to the extruder 10, 20, 30, 40, 50, 60, including phenol, resorcinol, formaldehyde and paraformaldehyde as monomers or in the form of precondensate, are substantially all reacted in the solid gel resin. In one preferred embodiment, the free formaldehyde in the solid gel resin is less than about 2%, or preferably less than about 1.5%, or preferably less than about 1% of the formaldehyde added to the extruder 10, 20, 30, 40, 50, 60. Therefore, these ingredients, phenol, resorcinol, formaldehyde and formaldehyde are essentially all reacted to form a completely three-dimensionally cross-linked, compact structure with high density. The solid gel resin is substantially free of phenol and/or resorcinol, i.e., <2 wt % free phenol and/or resorcinol, preferably <1 wt % free phenol and/or resorcinol, preferably <0.2 wt % free phenol and/or resorcinol. The concentration of these unreacted monomers is measured by grinding the solid gel resin and dispersing the particles of solid gel resin in an extraction solvent, filtering off solids, and then measuring their concentration in the filtered solvent extract with a High Performance Liquid Chromatography (HPLC).

The solid gel resin is preferably a large solid block. The solid gel resin can be preferably crushed into small particles. One type of techniques for crushing the solid gel resin is milling. Mills that may be used include, without limitation, impact mills such as Hammer Air Swept mills (Alpine, Bepex, Sturtevant); Hammer Conventional mills (Alpine, Fitzpatrick, Fluid Air, Mikro, Rietz, Stokes-Merrill); Pin/Disc mills (Alpine, Kemutec, Sturtevant); and Cage mills (Stedman); cutting mills (Alpine, Fitzpatrick, Urschel); and screening mills such as Rotating Impeller mills (Bepex, Fitzpatrick, Fluid Air, Jetpharma, Kemutec, Quadro), Stokes-Merrill and Zanchetta mills; Rotating Screen mills (Glatt); and Oscillating Bar mills (Bepex, Frewitt, Jackson-Crockatt, Stokes-Merrill, Vector). Any other type of milling techniques may also be used to obtain the desired particle size, particle size distribution and fines content.

Another type of technique for crushing the solid gel resin is by granulation. Numerous granulation techniques are known that are suitable for preparing water-dispersible granules of solid gel resins with a liquid surfactant. One such process is pan granulation. However, a more widely used granulation process is extrusion granulation.

The solid gel resin can also be preferably crushed into small particles by direct sizing. The direct sizing techniques preferably include cutoff saw, pull and cutoff, die face cutting, pelletizing, and spheronization.

The continuous process of the present invention using the extruder 10, 20, 30, 40, 50, 60 has several advantages to produce the solid gel resin.

1. Continuous reaction to make the liquid product and solid gel resin.
2. Provides shorter batch cycle time versus conventional batch reactor process and secondary post curing.
3. Reduces waste and results in a gel resin with higher non-volatile.
4. Exothermic potential of resorcinol/phenol and formaldehyde/paraformaldehyde reactions are much more controlled in the extruder 10, 20, 30, 40, 50, 60 versus batch reactor processes.

The solid gel resins, preferably crushed particles of the solid gel resins, may be further processed by freeze-drying to remove any remaining water, liquid components or volatiles in the solid gel resin.

After freeze-drying, the particles are preferably subjected to a carbonization or pyrolysis process to remove at least a portion of the non-carbon components, i.e., hydrogen, oxygen. The resulted carbonized or pyrolyzed particles contain primarily carbon. Any pyrolyzation or carbonization process can be used. In one example, the freeze-dried particles can be placed into a rotary kiln and heated therein. The pyrolysis process can be carried out under an inert atmospheres, e.g., a nitrogen, argon, or other inert gas or gas mixture.

The duration of the pyrolysis, i.e., the period of time during which the freeze-dried particles are maintained at the elevated temperature is preferably from about 30 seconds to about 10 hours, or preferably from about 1 minute to about 5 hours, or preferably from about 5 minutes to about 2 hours, or preferably from about 10 minutes to about 1 hour, or preferably from about 20 minutes to about 45 minutes. The pyrolysis temperature is preferably from about 600° C. to about 1,800° C., or preferably from about 600° C. to about 1,200° C., or preferably from or about 650° C. to about 1,100° C.

The product after pyrolysis is high density, compact C—C structure that can be used in ultra capacitors, gas absorbers, catalytic capacitors, batteries, or the like.

The following examples are illustrative, but not limiting, of the processes and compositions of the present disclosure. Other suitable modifications and adaptations of the variety of conditions and parameters normally encountered in the field, and which are obvious to those skilled in the art, are within the scope of the disclosure.

EXAMPLES

Example 1

In one example, the continuous process of the present invention is carried out using different sets of ingredients as shown in Table 1.

TABLE 1

List of ingredients used for producing the solid gel resins

| Ingredients | 1 | 2 | 3 | 4 | 5 | 6 |
|---|---|---|---|---|---|---|
| Gel resin 1 | Formaldehyde | Resorcinol | Acid | Formaldehyde | Buffer | |
| Gel resin 2 | Para-Formaldehyde | Resorcinol | Acid | Para-Formaldehyde | Buffer | |
| Gel resin 3 | Para-Formaldehyde | Resorcinol | Acid | Formaldehyde | Buffer | |
| Gel resin 4 | Formaldehyde | Resorcinol | Acid | Para-Formaldehyde | Buffer | |
| Gel resin 5 | Formaldehyde | Resorcinol | Phenol | Acetic Acid | Formaldehyde | |
| Gel resin 6 | Para-Formaldehyde | Resorcinol | Phenol | Acetic Acid | Para-Formaldehyde | Buffer |
| Gel resin 7 | Para-Formaldehyde | Resorcinol | Phenol | Acetic Acid | Formaldehyde | Buffer |
| Gel resin 8 | Formaldehyde | Resorcinol | Phenol | Acetic Acid | Para-Formaldehyde | Buffer |
| Gel resin 9 | RF Pre-condensate | Formaldehyde | Buffer | | | |
| Gel resin 10 | PRF Pre-condensate | Formaldehyde | Buffer | | | |
| Gel resin 11 | RF Pre-condensate | Para-Formaldehyde | Buffer | | | |
| Gel resin 12 | PRF Pre-condensate | Para-Formaldehyde | Buffer | | | |

Buffer = Ammonium Acetate

Example 2

Solid resorcinol-formaldehyde gel resin is produced by first mixing the resorcinol and a portion of formaldehyde to make a precondensate. The precondensate and the remaining portion of formaldehyde are added to an extruder. The density of the precondensate is 1114.385774 kg/m$^3$ (9.3 lb/gal). The formaldehyde is a 35 wt. % aqueous solution, with a density of 1102.403131 kg/m$^3$ (9.2 lb/gal).

Example 3

To make three different solid resorcinol-formaldehyde gel resins, the molar ratio of formaldehyde:resorcinol (F/R) used is 1.2, 1.6, or 2. The formaldehyde used in this example is 35 wt. % aqueous solution. Resorcinol and a portion of the formaldehyde are first mixed to make the precondensate, which is then added to an extruder with the remaining formaldehyde. The percentages of precondensate and formaldehyde aqueous solution added to the extruder for each solid gel resin are presented in Table 2.

TABLE 2

Gel resins with different F/R molar ratio

| Molar ration (F/R) | 1.2 | 1.6 | 2 |
|---|---|---|---|
| RF Pre-Condensate | 83.68 | 76.34 | 70.18 |
| 35% HCHO | 16.32 | 23.66 | 29.82 |

Example 4

A solid resorcinol-formaldehyde gel resin is made using a molar ratio of formaldehyde:resorcinol (F/R) at 1.20. The formaldehyde used in this example is 35 wt. % aqueous solution. Resorcinol and a portion of the formaldehyde are first mixed to make the precondensate, which is then added to an extruder with the remaining formaldehyde. The percentages of precondensate and formaldehyde added to the extruder are 83.68% and 16.32% respectively. The precondensate has a density of 1114.385774 kg/m$^3$ (9.3 lb/gal). The 35 wt. % formaldehyde aqueous solution has a density of 1102.403131 kg/m$^3$ (9.2 lb/gal).

The precondensate is added to the extruder at a rate of 96.62241669 ml/min, which corresponds to 8.04491427 kg/hr (16.736 lb/hr). The formaldehyde aqueous solution is added at a rate of 19.04897009 ml/min, which corresponds to 1.4805255 kg/hr (3.264 lb/hr), see Table 3. The extruder produces a liquid product at the rate of 7.71107 kg/hr (17 lb/hr).

TABLE 3

Production of solid resorcinol-formaldehyde gel resin

| Molar ration (F/R) 1.20 | Percent | Density | Rate | Addition (ml/min) |
|---|---|---|---|---|
| RF Pre-Condensate | 83.68 | 9.3 | 16.736 | 96.62241669 |
| 35% HCHO | 16.32 | 9.2 | 3.264 | 19.04897009 |

Example 5

A solid resorcinol-formaldehyde gel resin is made using a molar ratio of formaldehyde:resorcinol (F/R) at 1.60. The formaldehyde used in this example is 35 wt. % aqueous solution. Resorcinol and a portion of the formaldehyde are first mixed to make the precondensate, which is then added to an extruder with the remaining formaldehyde. The percentages of precondensate and formaldehyde added to the extruder are 76.34% and 23.66% respectively. The precondensate has a density of 1114.385774 kg/m$^3$ (9.3 lb/gal). The 35 wt. % formaldehyde aqueous solution has a density of 1102.403131 kg/m$^3$ (9.2 lb/gal).

The precondensate is added to the extruder at a rate of 98.51742669 ml/min, which corresponds to a rate of 6.925448305 kg/hr (15.268 lb/hr). The formaldehyde aqueous solution is added at a rate of 30.86531867 ml/min, which corresponds to a rate of 2.1463991 kg/hr (4.732 lb/hr), see Table 4. The extruder produces a liquid product at the rate of 8.61826 kg/hr (19 lb/hr).

TABLE 4

Production of solid resorcinol-formaldehyde gel resin

| Molar ration (F/R) 1.60 | Percent | Density | Rate | Addition (ml/min) |
|---|---|---|---|---|
| RF Pre-Condensate | 76.34 | 9.3 | 15.268 | 98.51742669 |
| 35% HCHO | 23.66 | 9.2 | 4.732 | 30.86531867 |

Example 6

A solid resorcinol-formaldehyde gel resin is made using a molar ratio of formaldehyde:resorcinol (F/R) at 2.0. The formaldehyde used in this example is 35 wt. % aqueous solution. Resorcinol and a portion of the formaldehyde are first mixed to make the precondensate, which is then added to an extruder with the remaining formaldehyde. The percentages of precondensate and formaldehyde added to the extruder are 70.18% and 29.82% respectively. The precondensate has a density of 1114.385774 kg/m3 (9.3 lb/gal). The 35 wt. % formaldehyde aqueous solution has a density of 1102.403131 kg/m3 (9.2 lb/gal).

The precondensate is added to the extruder at a rate of 95.33462495 ml/min, which corresponds to rate of 6.36662251 kg/hr (14.036 lb/hr). The formaldehyde aqueous solution is added at a rate of 40.94869435 ml/min, which corresponds to a rate of 2.70522489 kg/hr (5.964 lb/hr), see Table 5. The extruder produces a liquid product at the rate of 9.07185 kg/hr (19 lb/hr).

TABLE 5

Production of solid resorcinol-formaldehyde gel resin

| Molar ration (F/R) 2.0 | Percent | Density | Rate | Addition (ml/min) |
|---|---|---|---|---|
| RF Pre-Condensate | 70.18 | 9.3 | 14.036 | 95.33462495 |
| 35% HCHO | 29.82 | 9.2 | 5.964 | 40.94869435 |

Example 7

Different solid resorcinol-formaldehyde gel resins are made in this example. The formaldehyde used is 50 wt. % aqueous solution, which is divided into two portions. The first portion (HCHO$_{50}$ #1) is used to produce the precondensate and the second portion (HCHO$_{50}$ #2) is added to the extruder with the precondensate. Acetic acid (glacial acetic) is used as a catalyst. The initial molar ratio (IMR) of formaldehyde:resorcinol for making the precondensate is 0.82, with resorcinol and the first portion of formaldehyde (HCHO$_{50}$ #1). The calculated IMR is 0.822. The precondensate is then added to an extruder with the second portion of formaldehyde (HCHO$_{50}$ #2). The addition of the second portion of formaldehyde to the precondensate in the extruder bring the molar ratio formaldehyde:resorcinol to the second molar ratio (SMR) as well as calculated SMR (calc) shown in Table 6 for the different gel resins.

The solids in the liquid product exiting the extruder, except the acetic acid, is in the range of from 42.252 to 43.659 (Table 6).

TABLE 6

Production of different solid resorcinol-formaldehyde gel resins

| IMR | SMR | Water | Resorcinol | Glacial Acetic | HCHO$_{50}$ #1 | HCHO$_{50}$ #2 | SUM | SMR (calc) | IMR (calc) | Solids (no Acetic acid) |
|---|---|---|---|---|---|---|---|---|---|---|
| 082 | | 45.254 | 34.518 | 4.760 | 15.468 | 0.000 | 100.000 | 0.822 | 0.822 | 42.252 |
| 0.82 | 1.20 | 42.244 | 32.222 | 4.443 | 14.439 | 6.651 | 100.000 | 1.200 | 0.822 | 42.767 |
| 0.82 | 1.60 | 39.470 | 30.106 | 4.152 | 13.491 | 12.782 | 100.000 | 1.600 | 0.822 | 43.242 |
| 0.82 | 2.00 | 37.036 | 28.250 | 3.896 | 12.659 | 18.159 | 100.00 | 2.000 | 0.822 | 43.659 |

Example 8

The extruder of FIG. 5 is used to make three solid resorcinol-formaldehyde gel resins with a respective molar ratio of formaldehyde to resorcinol 2.00, 1.60, or 1.20. The extruder of FIG. 5 has total twelve sections each is heated by a heating barrel. The temperatures for each section of the extruder are listed in Table 7.

For the two solid resorcinol-formaldehyde gel resins with molar ratios of 2.00 and 1.60 (first two rows in Table 7), the extruder is configured to have one feed zone 51 and one reaction zone 52 and 53. There is no cooling zone for this configuration.

For the solid resorcinol-formaldehyde gel resin with a molar ratio of 1.20 (last row in Table 7), the extruder is configured to have one feed zone 51, one reaction zone 52, and one cooling zone 53.

TABLE 7

| | Temperature configurations in extruder | | | | | | | | | | | |
|---|---|---|---|---|---|---|---|---|---|---|---|---|
| RF MR | 1 | 2 | 3 | 4 | 5 | 6 | 7 | 8 | 9 | 10 | 11 | 12 |
| 2.00 | 20 | 90 | 90 | 90 | 100 | 100 | 100 | 110 | 110 | 110 | 120 | 130 |
| 1.60 | 20 | 90 | 90 | 90 | 100 | 100 | 100 | 110 | 110 | 110 | 120 | 130 |
| 1.20 | 30 | 90 | 90 | 90 | 70-120 | 70-120 | 90-155 | 100-160 | 110-165 | 110-130 | 50-100 | 50-90 |

Example 9

The extruder of FIG. 6 is configured with temperatures for each section of the extruder listed in Table 8. The extruder is configured to have one feed zone 61, and one reaction zone 62, and one cooling zone 63 (FIG. 6).

TABLE 8

| | Temperature configurations in extruder | | | | | | | | | | | |
|---|---|---|---|---|---|---|---|---|---|---|---|---|
| Section | 1 | 2 | 3 | 4 | 5 | 6 | 7 | 8 | 9 | 10 | 11 | 12 |
| Temp C. | 90-115 | 90-115 | 90-115 | 100-115 | 135-140 | 135-140 | 140-160 | 140-160 | 115-160 | 115-160 | 30-50 | 20-40 |

UTILITY

The present invention is more efficient, has a faster reaction compared to a batch process, is highly customizable, and is less expensive. The continuous process can produce low cost solid gel resins from various low cost raw material sources.

All documents mentioned herein are hereby incorporated by reference in their entirety or alternatively to provide the disclosure for which they were specifically relied upon. The applicant(s) do not intend to dedicate any disclosed embodiments to the public, and to the extent any disclosed modifications or alterations may not literally fall within the scope of the claims, they are considered to be part hereof under the doctrine of equivalents.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

The invention claimed is:

1. A continuous process for preparing a solid gel resin selected from resorcinol-formaldehyde gel resins, phenol-formaldehyde gel resins, and phenol-resorcinol-formaldehyde gel resins, using an extruder having at least one feed zone with a first temperature and at least one reaction zone with a second temperature that is higher than the first temperature, the process comprising steps of:
   adding ingredients to the extruder at the at least one feed zone;
   mixing the ingredients under heat to effectuate reaction between the ingredients to produce a liquid product exiting the extruder, wherein the liquid product has a polydispersity (Mw/Mn) in a range of from 1.08 to 1.30; and
   converting the liquid product exiting the extruder to the solid gel resin with heat remaining in the liquid from the extruder wherein the solid gel resin product is completely cross-linked in all three dimensions and is essentially not soluble at room temperature in a non-degrading solvent selected from N N-dimethylformamide and dimethylsulfoxide.

2. The continuous process of claim 1, wherein the second temperature is in a range of from about 60° C. to about 190° C.

3. The continuous process of claim 1, wherein the first temperature is in a range of from about 30° C. to about 115° C.

4. The continuous process of claim 1, wherein the converting step comprises cooling down the liquid product to yield the solid gel resin.

5. The continuous process of claim 1, wherein the converting step comprises heating the liquid product to yield the solid gel resin and the heating is achieved by infrared heating or thermal heating.

6. The continuous process of claim 1, wherein the ingredients include a precondensate selected from a precondensate of phenol and formaldehyde, a precondensate of resorcinol and formaldehyde, and a precondensate of phenol, resorcinol and formaldehyde.

7. The continuous process of claim 6, wherein the ingredients further comprise formaldehyde.

8. The continuous process of claim 7, wherein the formaldehyde is in an aqueous solution having a concentration of from about 25 wt. % to about 50 wt. %, based on the weight of the aqueous solution.

9. The continuous process of claim 6, wherein the precondensate is produced by heating the ingredients.

10. The continuous process of claim 9, wherein the heating comprises heating the ingredients to a temperature in a range of from about 20° C. to about 120° C.

11. The continuous process of claim 6, wherein the precondensate has a number average molecular weight in a range of from about 150 to about 1,500 Dalton.

12. The continuous process of claim 6, wherein the precondensate has a viscosity in a range of from about 5 to about 100 cps.

13. The continuous process of claim 1, wherein the ingredients include a catalyst selected from an acid and a base.

14. The continuous process of claim 13, wherein the catalyst is an acid selected from acetic acid, formic acid, lactic acid, citric acid, and oxalic acid.

15. The continuous process of claim 1, wherein the ingredients have a molar ratio selected from formaldehyde:resorcinol, formaldehyde:phenol and formaldehyde:(phenol+resorcinol) and the molar ratio is in a range of from about 0.75 to about 3.5.

16. The continuous process of claim 1, wherein the extruder has a cooling zone between the reaction zone and the exit of the extruder, and the cooling zone has a third temperature.

17. The continuous process of claim 16, wherein the third temperature in the cooling zone is in a range of from about 40° C. to about 120° C.

18. The continuous process of claim 1, wherein the extruder has at least one vent to let water escape out of the extruder.

19. The continuous process of claim 1, wherein the ingredients are substantially reacted with each other such that the solid gel resin has free formaldehyde of less than 1.5%.

* * * * *